(12) United States Patent
McNicol et al.

(10) Patent No.: US 6,615,179 B1
(45) Date of Patent: *Sep. 2, 2003

(54) DATA DISTRIBUTION NETWORK AND METHOD OF USE

(76) Inventors: John D. McNicol, 9 Via Nandina, Rancho Santa Margarita, CA (US) 92688; Fred E. Bearden, III, 24991 Stonegate La., Laguna Niguel, CA (US) 92677

( * ) Notice: Subject to any disclaimer, the term of this patent is extended or adjusted under 35 U.S.C. 154(b) by 0 days.

This patent is subject to a terminal disclaimer.

(21) Appl. No.: 09/481,778

(22) Filed: Jan. 11, 2000

Related U.S. Application Data (63) Continuation-in-part of application No. 09/241,937, filed on Feb. 2, 1999, now Pat. No. 6,347,301.

(51) Int. Cl.[7] .................................................. G06F 17/60
(52) U.S. Cl. ................................. 705/1; 705/14; 705/5; 705/26; 705/27; 235/385
(58) Field of Search ............................. 705/1, 5, 6, 7, 705/8, 9, 10, 14, 26, 27; 235/376, 375, 383, 385, 472; 379/68, 67; 709/204, 203; 340/988, 905, 995; 186/61; 702/83, 33; 364/403, 705.06; 395/800

(56) References Cited

U.S. PATENT DOCUMENTS

| | | | |
|---|---|---|---|
| 4,387,296 A | 6/1983 | Newell et al. | 235/376 |
| 4,509,277 A | 4/1985 | Bolton | 40/1.5 |
| 4,628,193 A | 12/1986 | Blum | 235/375 |
| 4,654,793 A | 3/1987 | Elrod | 364/401 |
| 5,331,136 A | * 7/1994 | Koenck et al. | 235/375 |
| 5,380,994 A | 1/1995 | Ray | 235/472 |
| 5,444,768 A | * 8/1995 | Lemaire et al. | 379/68 |
| 5,455,409 A | 10/1995 | Smith et al. | 235/385 |
| 5,483,472 A | 1/1996 | Overman | 364/705.06 |
| 5,721,942 A | 2/1998 | Nishiyama et al. | 395/800 |
| 5,740,549 A | 4/1998 | Reilly et al. | |
| 5,821,512 A | 10/1998 | O'Hagan | 235/383 |
| 5,936,542 A | 8/1999 | Kleinrock et al. | |
| 5,943,653 A | 8/1999 | Ross et al. | |
| 6,055,509 A | * 4/2000 | Powell | 705/14 |
| 6,129,449 A | * 10/2000 | McCain et al. | 364/479.14 |
| 6,138,145 A | * 10/2000 | Kawanaka | 709/204 |

FOREIGN PATENT DOCUMENTS

| | | | |
|---|---|---|---|
| EP | 0629832 | * | 6/1993 |
| EP | 0710938 A2 | | 7/1995 |
| WO | 9504430 | * | 9/1995 |

OTHER PUBLICATIONS

Handheld net access device Dec. 31, 1998.*
Reading; Tom Brokaw's book celebrates those who won World war ll, Frazier Moore, Dec. 29, 1998.*
AT&T Labs gives voice to technology, Joseph R. Perone, Dec. 21, 1998.*
Top 10 miltinnationals, Dec. 31, 1998.*

(List continued on next page.)

*Primary Examiner*—Eric W. Stamber
*Assistant Examiner*—Mussie Tesfamariam
(74) *Attorney, Agent, or Firm*—O'Melveny & Myers LLP (57) ABSTRACT

A data distribution network for distributing data stores up-to-date or even real-time data in a central computer and disseminates the data through a plurality of data distribution nodes to a plurality of hand-held computers. The data distribution network distributes current or even real-time data to consumers and travelers directly to the location where the consumers and travelers are likely to require the data. In a preferred embodiment, such a data distribution network can function completely automatically, in real time, and without any effort or expertise on the part of the consumer or traveler. Such a data distribution network enables several novel methods of attracting and retaining consumers to a specific commercial location and travelers to a specific hotel or travel agency.

18 Claims, 7 Drawing Sheets

OTHER PUBLICATIONS

Lost ticket data costly for NSU Dec. 31, 1998.*

Muirhead Greg, Hand–held device could help pharmacists make home visits, pp. 1–2, May 23, 1994.

Takahashi Dean, Professor's Idea for Speedy Chip could be More Than Academic, Wall Street Journal; New York, pp 1–3, Aug. 28, 1998.

Sun Mircosystems: Java platform for consumer devices ships, pp 1–2; Jan. 9, 1998, M2 Presswire: Coventry.

April Carolyn A., NEC and Sharp introduce hand–held devices, pp 1–2, Nov. 4, 1996, InfoWorld, Framingham.

April Carolyn A., Microsoft's Pegasus plans take wing, pp 1–2, Sep. 16, 1996, InfoWorld; Framingham.

Peter Laufer, The World in Your Pocket Special Supplement to The Economist Oct. 9–15, 1999.

* cited by examiner

DATA DISTRIBUTION NETWORK AND METHOD OF USE

This application is a continuation-in-part of patent application Ser. No. 09/241,937 filed Feb. 2, 1999, now U.S. Pat. No. 6,347,301.

BACKGROUND OF THE INVENTION

1. Field of the Invention

This invention relates generally to data distribution networks, and more particularly to a data distribution network that distributes real-time data directly to consumers via data distribution nodes installed in locations accessible to the consumer when the data is required.

2. Description of Related Art

The following art defines the present state of this field: Newell, U.S. Pat. No. 4,387,296, discloses a portable computer for use in the utility industry. A user reads the numeric information on the utility meter, enters the data into the computer, and is then able to manipulate the data associated with that account, including calculating the customer's bill. Blum, U.S. Pat. No. 4,628,193, discloses a hand-held electronic apparatus that contains a database of information about a plurality of workers. The user inputs an alphanumeric identifier, such as the worker's identity, and is able to access data about that person, specifically, what assignment that worker should receive.

Many similar references disclose handheld computers being used to access databases of information about persons and inventories in response to either alphanumeric or machine-readable indicia. O'Hagan, U.S. Pat. No. 5,821,512, and Overman, U.S. Pat. No. 5,483,472, disclose shopping cart or hand-held portable computers for retrieving information about products while shopping. Nishiyama, U.S. Pat. No. 5,721,942, discloses a personal information display system for serving large capacities of general information to user-designated stations at user-designated times. Smith, U.S. Pat. No. 5,455,409, discloses an apparatus for monitoring a plurality of coded articles and for identifying the location of selected items. Ray, U.S. Pat. No. 5,380,994, discloses a hand-held computer for inventory control. Koenck, U.S. Pat. No. 5,331,136, discloses a hand-held computer data-capture system. Sussman, U.S. Pat. No. 5,262,940, discloses a portable media tracking device.

It is also known to send data to a cellular phone, as discussed in The Economist, Special Is Telecommunications Supplement, Oct. 9–15, 1999. This article discusses novel cellular phones that have many computer-like functions, such as maintaining your calendar and contact database. The article also discusses the novel cellular phones that send and receive data, including sports scores, stock data, biorhythms, and even dating services.

The prior art teaches the use of computer networks to disseminate data through an organization to achieve certain goals, such as inventory control. However, the prior art does not teach a centrally located computer that distributes a stream of constantly updated data to a plurality of data distribution nodes for periodic download to a plurality hand-held computers, as taught by this invention. There is a long-felt need for people to be able to download current consumer and travel data into a hand-held computer; and there is a long-felt need for people to be able to accomplish this download while in the process of either shopping or traveling. The prior art does not teach the distribution of hand-held computers to a plurality of consumers for download, while the consumer is shopping, of current purchasing information often required by a consumer. The prior art also does not teach the distribution of hand-held computers to a plurality of travelers for download, during the course of the traveler's trip, of current travel information often required by a traveler. The present invention fulfills these needs and provides further related advantages as described in the following summary.

SUMMARY OF THE INVENTION

The present invention teaches certain benefits in construction and use which give rise to the objectives described below.

The present invention provides a data distribution network for distributing data. The data distribution network stores up-to-date or even real-time data in a central computer and disseminates the data through a plurality of data distribution nodes to a plurality of hand-held computers. The data distribution network distributes current or real-time data to consumers and travelers directly to the location where the consumers and travelers are likely to require the data. In a preferred embodiment, such a data distribution network can function completely automatically, in real-time, and without any effort or expertise on the part of the consumer or traveler. Such a data distribution network enables several novel methods of attracting and retaining consumers to a specific commercial location and travelers to a specific hotel or travel agency.

A primary objective of the present invention-is to provide a data distribution network having advantages not taught by the prior art.

Another objective is to provide a data distribution network that can deliver current information directly to consumers and travelers while they are in the process of either purchasing goods or traveling away from home.

Another objective is to provide a data distribution network that can deliver data that is personalized to the individual user.

A further objective is to provide a data distribution network that provides hand-held computers that allow the user to carry the information with them for easy reference.

Other features and advantages of the present invention will become apparent from the following, more detailed description, taken in conjunction with the accompanying drawings, which illustrate, by way of example, the principles of the invention.

BRIEF DESCRIPTION OF THE DRAWING

The accompanying drawings illustrate the present invention. In such drawings.

DETAILED DESCRIPTION OF THE INVENTION

The above-described drawing figures illustrate the invention, a data distribution network 10 for distributing data. The data distribution network 10 stores up-to-date or real-time data in a central computer 20, and disseminates the data through a plurality of data distribution nodes to a plurality of hand-held computers 40. The data distribution network 10 distributes current or even real-time data to consumers and travelers directly to the location where the consumers and travelers are likely to require the data. In a preferred embodiment, the data distribution network 10 can function completely automatically, in real-time, without any effort or expertise on the part of the consumer or traveler. The data distribution network 10 enables several novel methods, described below, of attracting and retaining consumers to a specific commercial location and travelers to a specific hotel or travel agency.

Figure 1:
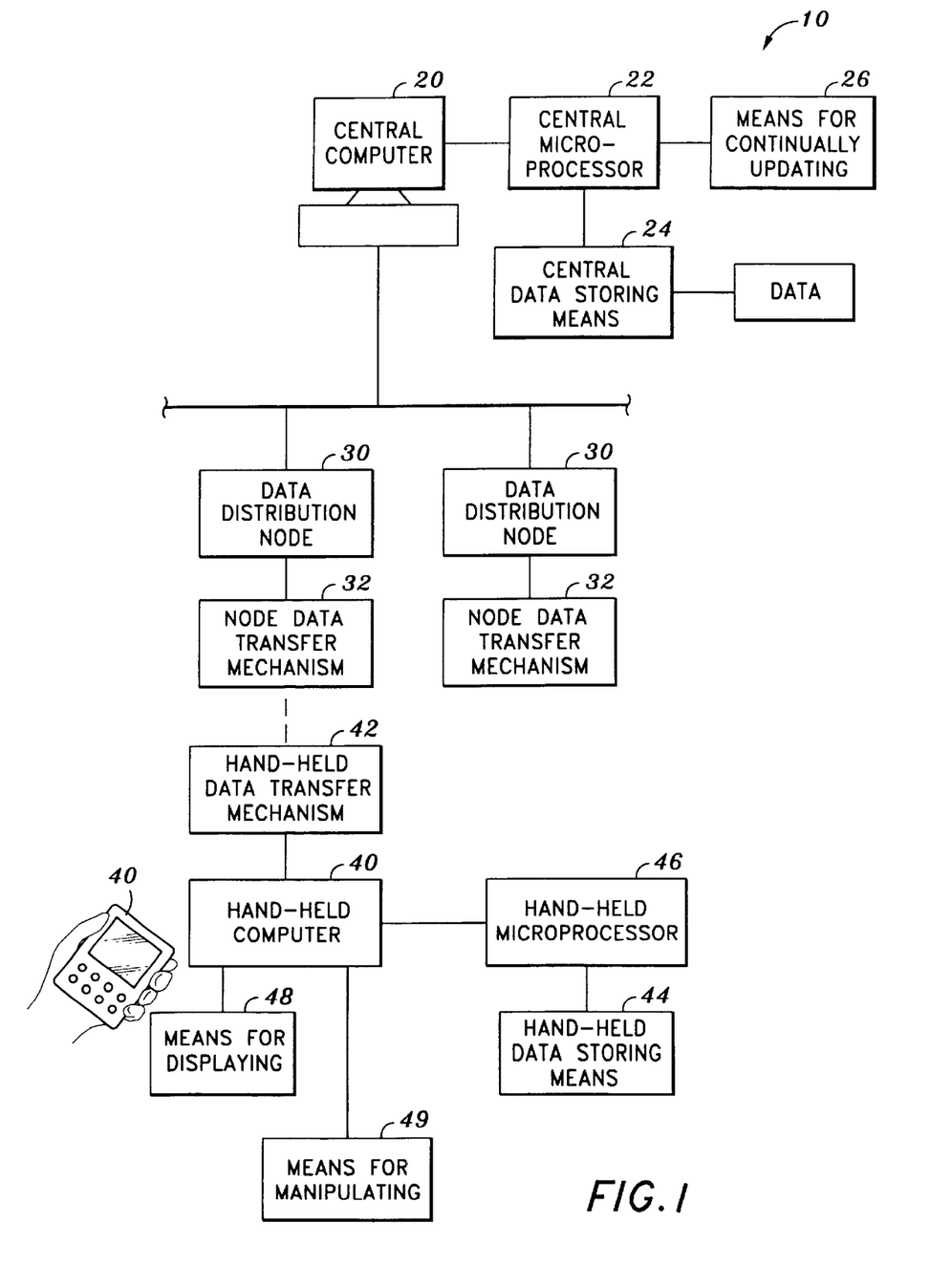
FIG. 1 is a block diagram of the present invention.

As shown in FIG. 1, the data distribution network 10 relies on the central computer 20 to store and maintain the data. The central computer 20 has a central microprocessor operably connected to a central means for storing the data 24. In the preferred embodiment, central computer 20 is a server or personal computer having a CPU, RAM, ROM and hard drive, all operably connected by a motherboard (not shown). The central computer 20 further has a means for updating the data 26. Most of the data that is discussed herein is already maintained somewhere in an existing computer network; therefore, the data updating means 26 is preferably an operable connection to many other external computer networks with software necessary to transfer the current data into the central storing means of the central computer 20. In alternative embodiments, the data updating means 26 is a keyboard and mouse, or some other well known data entry mechanism. Since computers, computer networks, data updating means 26, and similar devices and systems are well known to those skilled in the art, they are not discussed at length herein.

As shown in FIG. 1, the data distribution network 10 uses the plurality of data distribution nodes 30 to transmit the data from the central computer 20 to the plurality of hand-held computers 40. Each of the plurality of hand-held computers 40 has a hand-held data transfer mechanism 42, and a hand-held means for storing the data 44 operably connected to a hand-held microprocessor 46. The hand-held data transfer mechanism 42 is discussed in more detail below. The hand-held means for storing the data 44 is preferably a memory chip operably connected to a hand-held microprocessor 46, both well known in the art. Each of the plurality of hand-held computers 40 further has a means for displaying 48 the data and a means for manipulating 49 the data. The means for displaying 48 the data is preferably an LCD screen electronically connected to the memory means through an LCD driver chip (not shown), although many equivalent displays are well known in the art. In a first embodiment, the data manipulation means 49 is a keypad, either with an entire "qwerty" keyboard, or a reduced size keypad, designed to navigate a series of menus. In a second embodiment, the data manipulation means 49 is a microphone electronically connected to the hand-held computer 40, the hand-held computer 40 having a means for converting sound (not shown) into computer commands.

The plurality of data distribution nodes 30 are operably connected to the central computer 20, preferably through a global communications network such as the Internet™ or an equivalent network. Establishing such a connection is well known to those skilled in the art. It is not essential that the operable connection maintain a constant flow of data—the connection can be made temporarily on a periodic basis for the purpose of updating data. In its preferred embodiment, each of the plurality of data distribution nodes 30 is a computer having a CPU, RAM, ROM and a hard drive, all operably connected by a motherboard as described above. By providing the data distribution node 30 with a hard drive, the data distribution node 30 is able to store data for retrieval, thereby eliminating the requirement of a permanent connection to the central computer 20.

Each of the data distribution nodes 30 has a node data transfer mechanism 32 for transferring the data from the central computer 20 to the hand-held data transfer mechanism 42 of one of the hand-held computers 40 in response to a request from the hand-held data transfer mechanism 42. The node data transfer mechanism 32 cooperates with the hand-held data transfer mechanism 42 to operably connect one of the data distribution nodes 30 to the hand-held computer 40 that is requesting data.

Figures 2, 3:
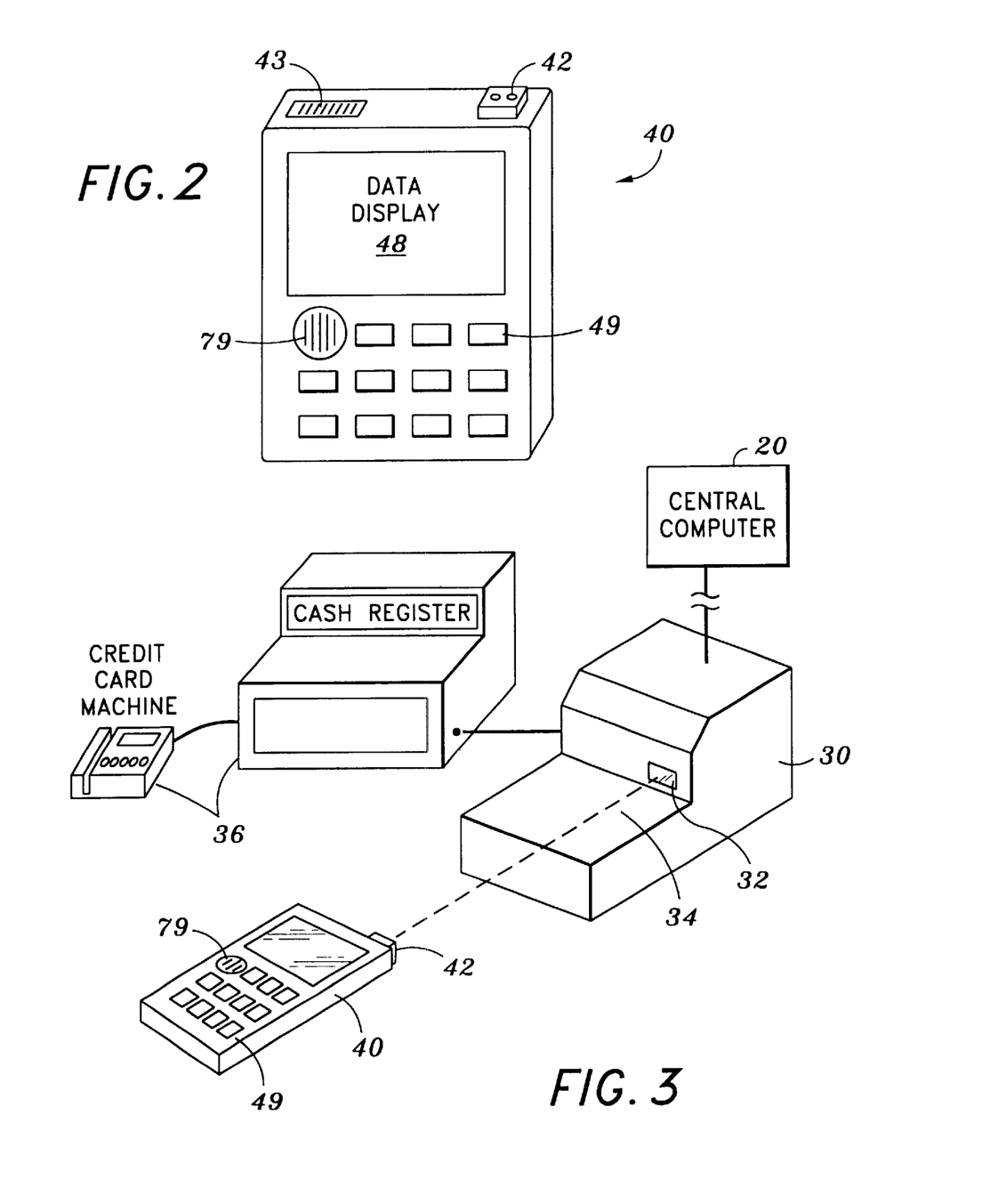
FIG. 2 is a perspective view of the hand-held computer having an electrical contact connector.
FIG. 3 is a perspective and partially exploded view of a data distribution node operably connected to a cash register and a credit card reader, the data distribution node having a docking station for receiving one of the plurality of hand-held computers.

In a first embodiment, as shown in FIG. 3, each of the plurality of data distribution nodes 30 include a docking station 34 adapted to receive one of the plurality of hand-held computers 40. In this first embodiment, the node data transfer mechanism 32 is a first electrical contact connector, and the hand-held data transfer mechanism 42 is a second electrical contact to connector. When the hand-held computer 40 is inserted into the docking station 34, the first electrical contact connector 32 forms an electronic connection with the second electrical contact connector 34, thereby allowing the hand-held computer 40 to communicate with the data distribution node 30. The benefit of the first embodiment is that large amounts of data can be transferred very quickly to the hand-held computer 40 with relatively inexpensive equipment.

Figure 4:
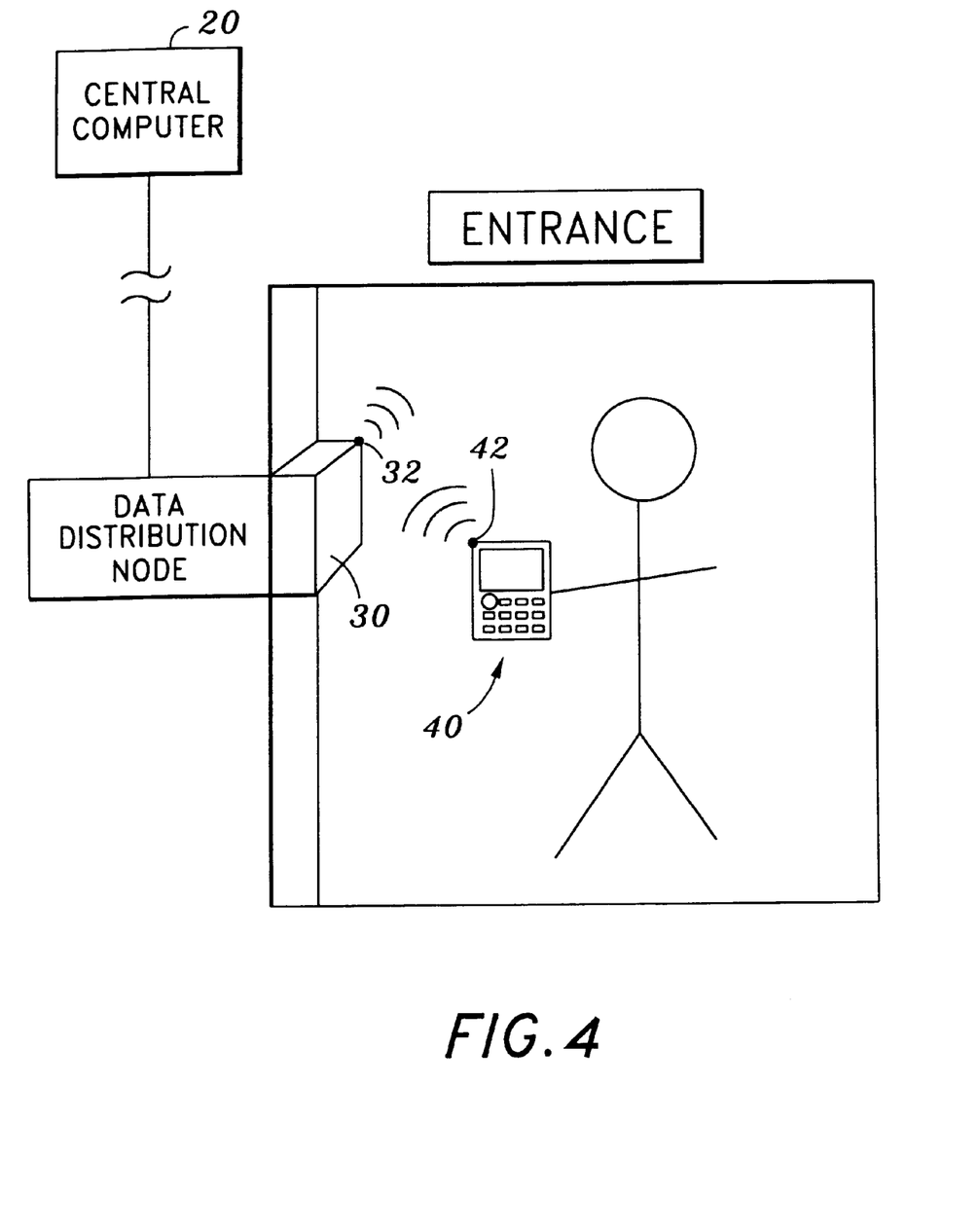
FIG. 4 is a perspective view of the hand-held computer showing a second embodiment of the hand-held data transfer mechanism, the hand-held data transfer mechanism, including a first transmitter/receiver that operates in cooperation with a second transmitter/receiver of the second embodiment of the data distribution node.

In a second embodiment, as shown in FIG. 4, the hand-held data transfer mechanism 42 is a first transmitter/receiver electronically connected to the hand-held computer 40, and the node data transfer mechanism 32 is a second transmitter/receiver electronically connected to the data distribution node 30. The operative connection between the first and second transmitter/receivers 42 and 32 enables electronic communication between each of the plurality of hand-held computers 40 and the central computer 20 through the data distribution node 30 that is closest to the hand-held computer 40. In the preferred embodiment, each of the plurality of data distribution nodes 30 at least periodically emits an identification signal that alerts any of the plurality of hand-held computers 40 within range that the hand-held computer 40 is within range. In this embodiment, the hand-held computer 40 has a means to automatically transmit the request to the nearest data distribution node 30 once the hand-held computer 40 receives the identification signal. This allows the hand-held computer 40 to immediately update the data itself without waiting for the user to initiate the transfer.

In another embodiment, as shown in FIG. 2, each of the plurality of hand-held computers 40 further includes a smart label 43 that reflects the identification signal to form a reflected signal that is unique to each of the hand-held computers 40. The receipt of the reflected signal by the data distribution node 30 is reported to a report database 52 of the central computer 20. In either embodiment, it is desirable to provide the central computer 20 with a report database 52 so that the system administrators can track the buying habits of the users.

Figure 6:
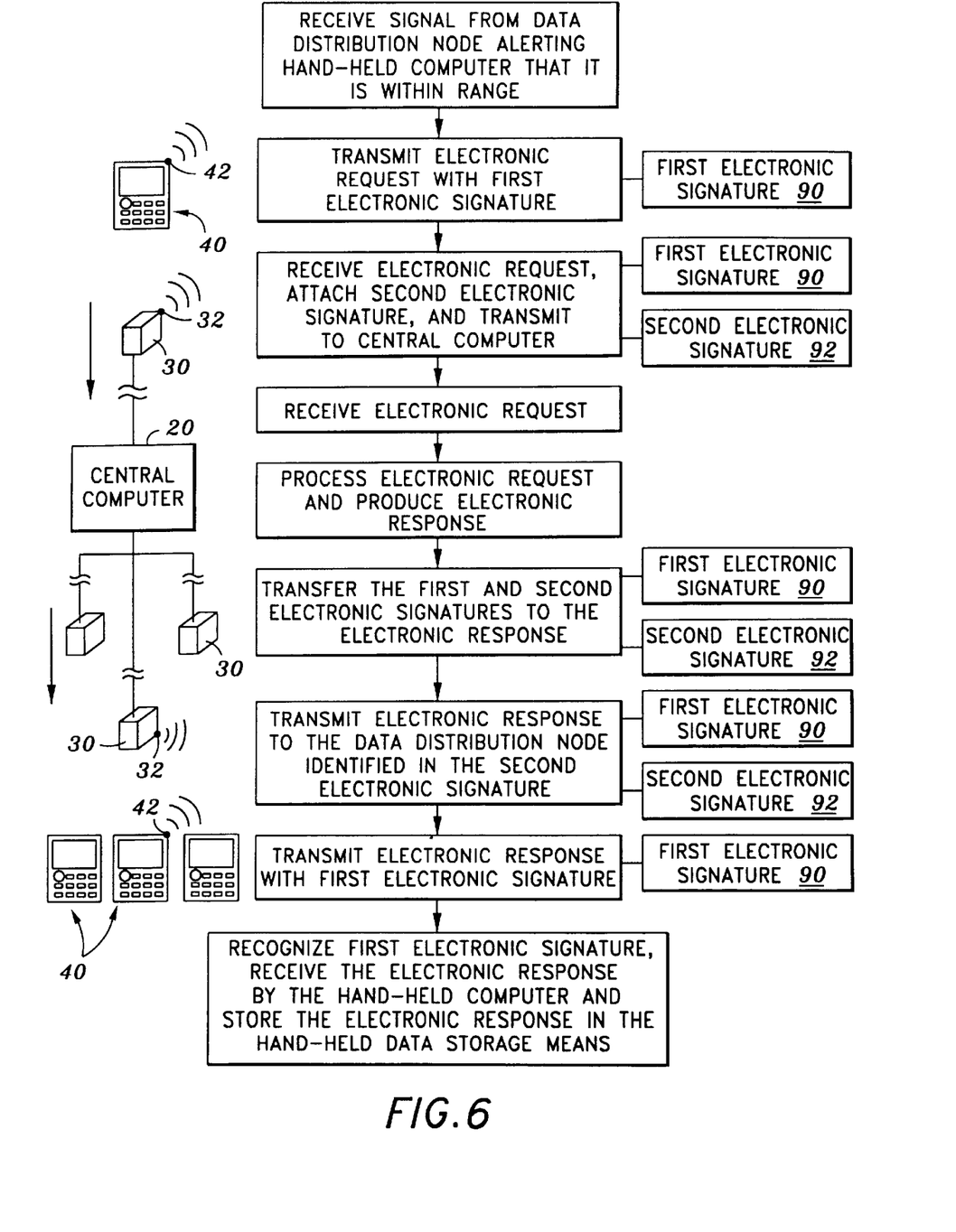
FIG. 6 is a flow diagram of showing the transmission of an electronic request from the hand-held computer to the central computer and the transmission of an electronic response back to the hand-held computer.

When using the first and second transmitter/receivers 42 and 32, it is necessary to develop a system of tracking which of the plurality of hand-held computers 40 sent the data request and which of the data distribution nodes 30 received the data request. In the preferred embodiment, as shown in FIG. 6, each of the hand-held computers 40 transmits an electronic request to the data distribution node 30 with a first electronic signature 90 that identifies the hand-held computer 40 that is transmitting the electronic request. The electronic request is delivered to the central computer 20 with a second electronic signature 92 that is unique to that particular data distribution node 30. The second electronic signature 92 identifies the location of the data distribution node 30 that delivered the electronic request. Once the electronic request has been processed by the central microprocessor 22, the electronic response that has been prepared is delivered from the central computer 20 to the data distribution node 30 identified in the second electronic signature 92. The electronic response is transmitted from the second transmitter/receiver 32 of the data distribution node 30 and routed to the hand-held computer 40 that sent the electronic request as directed by the first electronic signature 90. The electronic response can then be stored in the hand-held data storing means 44 and displayed on the display screen.

Consumer Loyalty System

Figure 5:
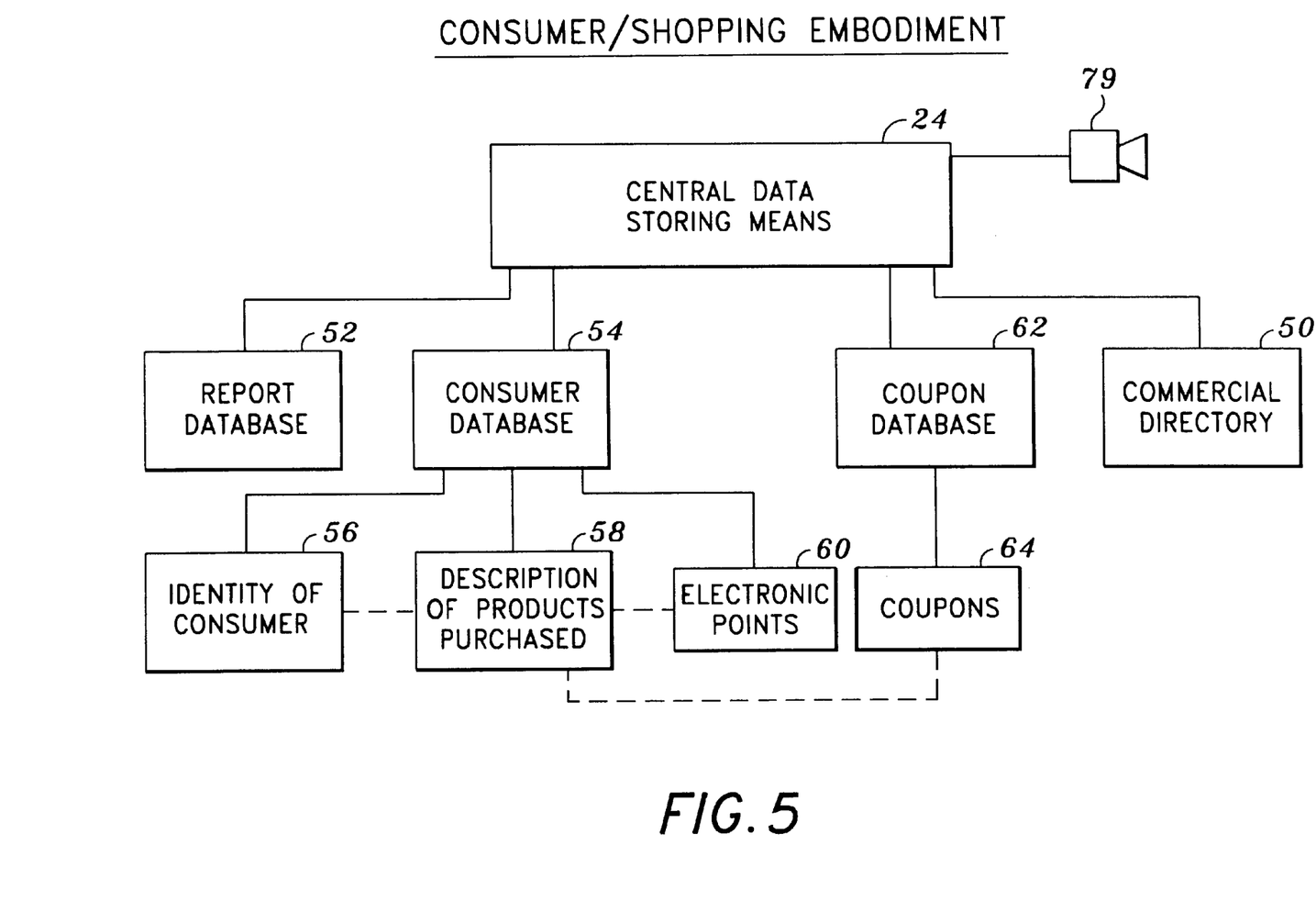
FIG. 5 is a block diagram of the consumer shopping embodiment of the invention.

As shown in FIG. 5, the invention includes a method for interacting with, exchanging data with, and rewarding a consumer. The method utilizes the data distribution network 10 described above to encourage the consumer to remain loyal to a commercial location such as a shopping mall. Each of the data distribution nodes 30 is installed in publicly accessible locations within or in proximity to the commercial location. Likely locations include entrances and kiosk locations throughout a mall or shopping center. Each of the data distribution nodes 30 is operably connected to the central computer 20, preferably with standard cables, although wireless configurations are also possible and well within the skill of those skilled in the art. Each of the plurality of hand-held computers 40 is distributed to one of the consumers. Various promotional programs can be devised by marketing professionals to either sell or give away the hand-held computers 40 to people who are likely to shop in the commercial location.

When the consumer enters the commercial location, the hand-held data transfer mechanism 42 of the hand-held computer 40 is operatively connected with the node data transfer mechanism 32 of the closest of the plurality of data distribution nodes 30. This can be accomplished with any of the above-described methods, preferably by automatically downloading at least a portion of a commercial directory 50 through the data distribution node 30 to the hand-held data storing means 44. The commercial directory 50 includes basic information about the commercial location such as a map of the location, which items are on sale and where the items are located. This commercial directory 50 is preferably made available to consumers so that they are able to gather data and have questions answered directly from their hand-held computer 40.

In the preferred embodiment, the central computer 20 further includes a report database 52. The data distribution network 10 automatically tracks the movement of the consumer through the commercial location, recording how much time is spent in each area of the commercial location. Those skilled in the art can devise countless methods for improving such a system, including GPS systems and triangulation between the data distribution nodes 30. The data gathered from this aspect of the system is stored in the report database 52 for later reference and use. The central computer 20 is then able to interact with the consumer based on the "memory" of the central computer 20 as to where the consumer is located within the commercial location and what he or she has been doing within the commercial location.

In the preferred embodiment, the central computer 20 further includes a consumer database 54. The consumer database 54 stores an identity of each consumer 56 with a description of products purchased 58 by that consumer and a plurality of electronic points 60 associated with the consumer. To gather and associate the data required for this embodiment, the data input means 36 is preferably a cash register electronically connected to one of the data distribution nodes 30. Once the consumer has selected the products he or she would like to purchase, the description of products purchased 58 is inputted through the cash register into the consumer database 54. The hand-held computer 40 is then operably connected with the data distribution node 30, preferably through a docking station 34 as described above, so that the identity of the consumer 56 making the purchase can be transmitted to the central computer 20 for proper association with the description of the products purchased 58. This data allows a plurality of electronic points 60 to be awarded to the consumer in proportion to the value of the products purchased. The plurality of electronic points 60 is added to any other electronic points 60 already earned and the sum is recorded in the consumer database 54. Those skilled in marketing can devise multiple marketing schemes that allow the value of the accumulated electronic points 60 to be exchanged for a reward of some sort. Such a reward acts as an incentive for the consumer to accumulate the electronic points 60 by making their purchases at the commercial location.

In another embodiment of this invention, the method preferably further includes a coupon database 62 containing a plurality of coupons 64. When the hand-held computer 40 transmits the data request, the central computer 20 locates the identity of the consumer, references the description of products purchased 58 associated with that consumer, and compares the description of products purchased 58 with a plurality of coupons 64 available in the coupon database 62. The plurality of coupons 64 that are determined to be similar to the description of products purchased 58 are then offered to the consumer as an incentive to purchase additional goods at the commercial location. In an alternative embodiment, the central computer 20 transmits a random sampling of some of the plurality of coupons 64 available in the coupon database 62 without restricting the coupon availability to those that are somehow related to the user.

Another important aspect of this invention is that the combination of the above-described features allows even further innovation. For instance, the central computer 20 can "learn" about the buying habits of the consumer based on the report database 52 and the consumer database 54, marketing efforts such as special coupons from the coupon database 62 can be directly targeted to the consumer. Those skilled in the marketing profession can devise many special programs to be used within the framework of this invention without deviating from the inventive spirit of the invention described herein.

Flight Data System

Figure 7:
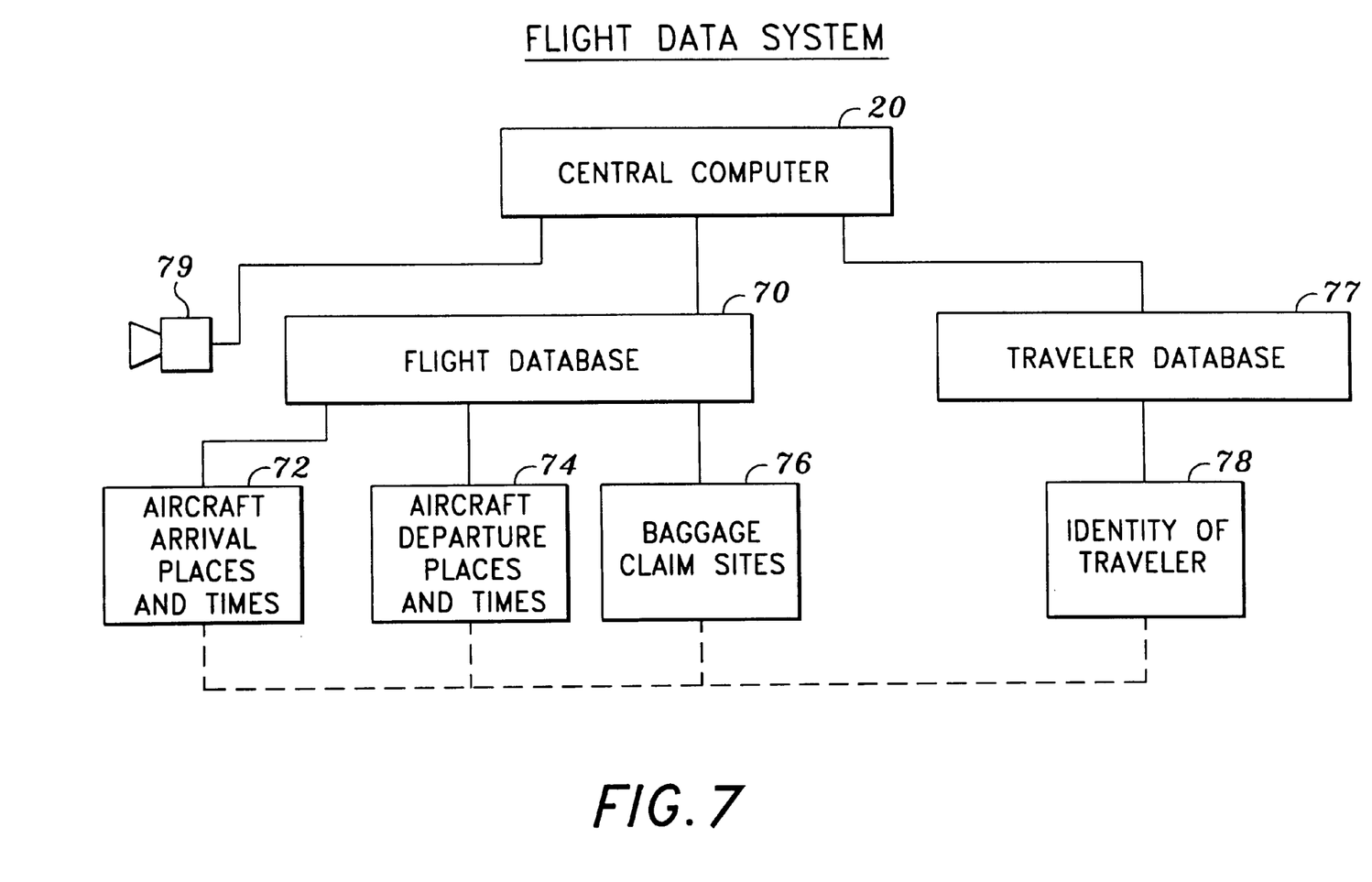
FIG. 7 is a block diagram of a flight data system embodiment of the present invention.

As shown in FIG. 7, the invention also includes a method for distributing flight data to a traveler. While we refer specifically to flight data for airlines, it should be understood by those skilled in the art that the system is equally useful for a variety of forms of transportation, including busses, ferries, trains, boats, etc. These alternative embodiments are expressly considered equivalent to the embodiment described herein. In this embodiment, the central data storing means 24 is programmed to store a flight database 70 and a traveler database 77. The flight database 70 contains a plurality of aircraft arrival places and times 72 and a plurality of aircraft departure places and times 74. In its preferred embodiment, the flight database 70 also includes a plurality of baggage claim sites 76.

The traveler database 77 containing a plurality of identities of travelers 78. Those skilled in the art will recognize that the consumer database 54 can function as the traveler database 77. When a ticket is prepared for the traveler, the airplane ticket is associated with one of the plurality of aircraft departure places and times 74, one of the plurality of aircraft arrival places and times 72, and one of the baggage claim sites 76. The identity of the traveler 78 is inputted into the flight database 70 and associated with the aircraft departure time and place 72, the aircraft arrival time and place 74, and the baggage claim site 76 associated with the ticket purchased by the traveler. The data distribution nodes 30 are preferably installed in publicly accessible locations within an airport, thereby allowing the traveler to access the flight database 70 on a regular basis to review the current aircraft departure time and place 72, the current aircraft arrival time and place 74, and the baggage claim site 76.

In the most preferred embodiment, the hand-held computer 40 automatically signals the central computer 20 when the traveler enters the airport. The central computer 20 can then compare the identity of the traveler 78 with the associated flight arrival places and times 74 and the flight departure places and times 72 and alert the traveler if there have been any changes to the associated flight arrival places and times 74 and the flight departure places and times 72. In this embodiment, the hand-held computer 40 further includes a means of warning the traveler 79, such as a speaker that emits an audible tone if there has been a change in his or her schedule. In an alternative embodiment, the central computer 20 advises the airline reservation and ground services department of the arrival of a passenger and permit the people to contact the passenger through the central computer 20 via the hand-held computer 40. There are many specific uses that can be devised for this system by those skilled in the art, and obvious variations of the above described system are considered equivalent to the best mode described herein.

Electronic Concierge System

Figure 8:
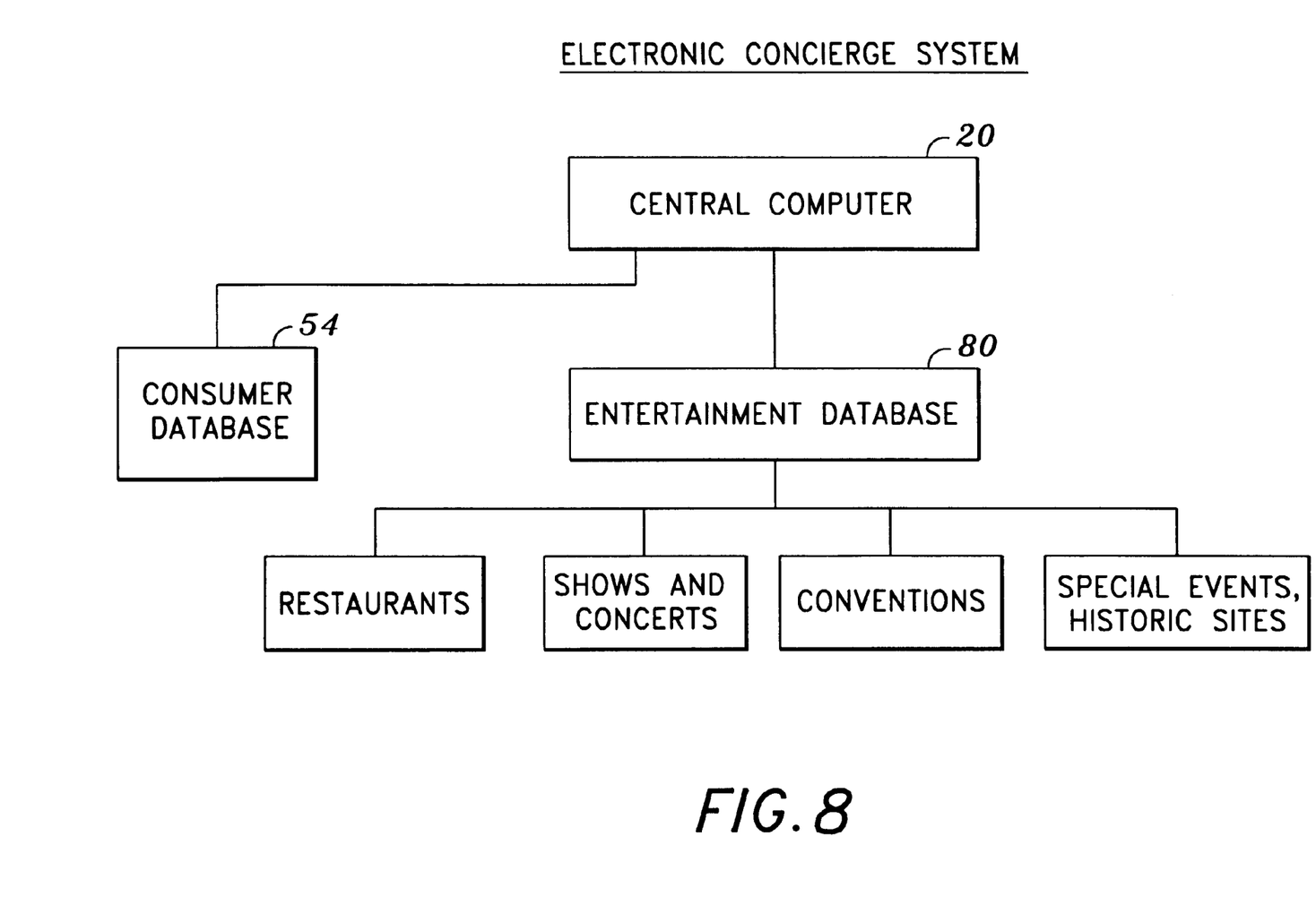
FIG. 8 is a block diagram of an electronic concierge system embodiment of the present invention.

As shown in FIG. 8, the invention further includes a method for providing an electronic concierge service to at least one hotel guest. In this embodiment, the central computer 20 is programmed with an entertainment database 80. When a hotel guest is checked into the hotel, he or she is provided with the hand-held computer 40 described above. At least one data distribution node 30 is installed in the hotel for updating the hand-held computer 40 as described above. An employee is then responsible for inputting into the entertainment database 80, on a regular basis, entertainment information of interest to the hotel guest. The entertainment database 80 preferably includes a list of restaurants, shops, shows, concerts, conventions, special events, historic sites or other sites of interest to tourists. The entertainment database 80 preferably includes information about prices, menus, special discounts and other specialty information. In the preferred embodiment, the central computer 20 can also facilitate the purchase of tickets to the various events, preferably at discounted rates. The discounted rates can be provided by either taking advantage of commercially available coupons or special engagements, or the hotel can negotiate special rates for its guests.

In the preferred embodiment, the central computer 20 of this embodiment further includes the consumer database 54 described above. The consumer database 54 allows the system to track users and customize data to suit the needs of the individual consumer, as well as return valuable marketing data about the consumer. As noted above, those skilled in the art can devise countless marketing programs around the novel capabilities of this system.

Travel Agency Data Distribution System

In its more complex embodiment, the invention can include many of the above-described embodiment and administered by a travel agency or similar company to provide a traveler with a great deal of information throughout his or her travels. Such an embodiment would preferably include, at a minimum, a traveler database 77, a flight database 70, and an entertainment database 80 as previously described. The data distribution network 10 preferably further includes news, alerts, and other data information of interest to travelers, especially those travelling to other countries. One particular benefit of having a travel agency manage the data distribution network 10 is that they would have the economic clout to negotiate special deals throughout the world and allows the traveler to purchase many tickets before traveling and with U.S. dollars, thereby avoiding difficulties in changing money.

All of the data can be centrally managed and updated for real-time or near real-time distribution to thousands of travelers. By bringing the data under central and professional management, the individual traveler can receive all of the benefits of a major travel agent in real time and at his or her fingertips. Furthermore, it is expected that the several embodiments will be compatible so that the hand-held computer 40 of one embodiment may respond to the signals of different central computers 20.

All of the above embodiments include advertising indicia printed or otherwise marked on the hand-held computer 40 or generated by the display of the hand-held computer 40. The advertising indicia is sold to relevant sponsors; and the money generated by the sale either defrays or entirely eliminates the cost of manufacturing the hand-held computer 40.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A method for interacting with, exchanging data with, and rewarding a consumer to encourage the consumer to remain loyal to a commercial location, the method comprising the steps of:

a) providing a central computer having a central microprocessor operably connected to a central means for storing data, the central data storing means including a commercial directory;

b) providing a hand-held computer having a display screen, a means for data entry, a hand-held data transfer mechanism, and a hand-held means for storing data operatively connected to a hand-held microprocessor;

c) providing a plurality of data distribution nodes, each of the data distribution nodes having a means for inputting data into the central data storing means and a node data transfer mechanism;

d) installing each of the data distribution nodes in publicly accessible locations within or in proximity to the commercial location;

e) operably connecting each of the data distribution nodes to the central computer;

f) delivering the hand-held computer to the consumer;

g) operatively connecting the hand-held data transfer mechanism of the hand-held computer with the node data transfer mechanism of the closest of the plurality of data distribution nodes;

h) transmitting a data request to the central computer from the hand-held data transfer mechanism through the node data transfer mechanism of the closest of the plurality of data distribution nodes; and i) transmitting at least a portion of the commercial directory through the node data transfer mechanism and the hand-held data transfer mechanism to the hand-held data storing means.

2. The method of claim 1 wherein each of the plurality of data distribution nodes include a docking station adapted to receive one of the plurality of hand-held computers; wherein the node data transfer mechanism is a first electrical contact connector; wherein the hand-held data transfer mechanism is a second electrical contact connector; and wherein the hand-held data transfer mechanism is operatively connected to the data distribution node by inserting one of the plurality of hand-held computers is into the docking station, thereby connecting the first electrical contact connector with the second electrical contact connector, and thereby allowing the data distribution node to transmit data between the hand-held computer and the central computer.

3. The method of claim 1 wherein the hand-held data transfer mechanism is a first transmitter/receiver electronically connected to the hand-held computer; wherein the node data transfer mechanism is a second transmitter/receiver electronically connected to the data distribution node; and wherein the operative connection between the first and second transmitter/receivers enables electronic communication between each of the plurality of hand-held computers and the central computer.

4. The method of claim 3 further comprising the step of:

f') transmitting an identification signal, at least periodically, from the second transmitter/receiver of the data distribution node, alerting any of the plurality of hand-held computers that are within range of the transmission that they are within range.

5. The method of claim 4 further comprising the steps of:

f'') providing each of the plurality of hand-held computers with a means for automatically transmitting the data request to the nearest data distribution node once the hand-held computer receives the identification signal.

6. The method of claim 4 further comprising the steps of:

f'') providing each of the plurality of hand-held computers with a smart label that reflects the identification signal to form a reflected signal that is unique to each of the hand-held computers, the receipt of the reflected signal by the data distribution node being reported to a report database of the central computer.

7. The method of claim 3 further comprising the steps of:

g) using the first transmitter/receiver of the hand-held computer to transmit an electronic request to the central computer through the second transmitter/receiver of the data distribution node, the electronic request containing a first electronic signature that identifies the hand-held computer that is transmitting the electronic request;

h) delivering the electronic request to the central computer with a second electronic signature, the second electronic signature identifying the location of the data distribution node that delivered the electronic request;

i) processing the electronic request by the central microprocessor and preparing an electronic response;

j) delivering the electronic response from the central computer to the data distribution node identified in the second electronic signature;

k) transmitting the electronic response from the second transmitter/receiver of the data distribution node, the transmission being routed to the hand-held computer that sent the electronic request as directed by the first electronic signature;

l) storing the electronic response in the hand-held data storing means; and m) displaying the electronic response on the display screen.

8. The method of claim 1 wherein the central data storing means further includes a consumer database that associates a description of products purchased and a plurality of electronic points with an identity of each consumer; wherein the data input means is a cash register electronically connected to each of the data distribution nodes; and wherein the method further comprising the steps of:

j) selecting the products that the consumer would like to purchase k) inputting through the cash register a description of products purchased into the consumer database;

l) operably connecting the hand-held computer with the data distribution node;

m) transmitting the identity of the consumer making the purchase;

n) comparing the identity of the consumer with the consumer database;

o) associating the description of products purchased with the identity of the consumer in the consumer database;

p) awarding a plurality of electronic points to the consumer in proportion to the value of the products purchased;

q) adding the plurality of electronic points awarded to any other electronic points already earned;

r) recording the sum of all of the plurality of electronic points in the consumer database;

s) downloading to the hand-held computer the value of the accumulated electronic points;

t) providing a reward in exchange for the accumulated electronic points, the reward acting as an incentive for the consumer to accumulate the electronic points.

9. The method of claim 8 wherein the central data storing means further includes a coupon database containing a plurality of coupons; and wherein the method further comprising the steps of:

u) operably connecting the hand-held computer with the data distribution node;

v) transmitting the identity of the consumer with a request for coupons;

w) locating the identity of the consumer and the associated description of products purchased;

x) comparing the description of products purchased with the plurality of coupons available in the coupon database; and y) downloading the coupons that are determined to be similar to the description of products purchased.

10. A method for distributing flight data to a traveler, the method comprising the steps of:

a) providing a central computer having a central microprocessor operably connected to a central means for storing data;

b) programming into the central data storing means a flight database and a traveler database, the flight database containing a plurality of aircraft arrival places and times and a plurality of aircraft departure places and times, and the traveler database containing a plurality of identities of travelers;

c) preparing an airplane ticket for the traveler, the airplane ticket being associated with one of the plurality of aircraft departure places and times and one of the plurality of aircraft arrival places and times;

d) associating the identity of the traveler in the traveler database with the aircraft departure time and the aircraft arrival time associated with the airline ticket purchased by the traveler;

e) providing a hand-held computer having a display screen, a keypad, a means for requesting data, and a hand-held means for storing data operatively connected to a hand-held microprocessor;

f) providing a plurality of data distribution nodes, each of the data distribution nodes having a means for downloading data from the central data storing means to the handheld computer in response to the hand-held data transfer mechanism;

g) installing each of the data distribution nodes in publicly accessible locations within an airport;

h) operably connecting each of the data distribution nodes to the central computer;

i) delivering the hand-held computer to the traveler;

j) updating the flight data stored in the flight database on a regular basis;

k) operatively connecting the hand-held microprocessor with the closest of the plurality of data distribution nodes when the traveler is ready to travel;

l) using the hand-held data transfer mechanism to transmit the identity of the traveler to the central computer through the closest of the plurality of data distribution nodes; and m) transmitting, from the central computer to the to the hand-held data storing means, the current aircraft departure time and the current aircraft arrival time associated with the identity of the traveler.

11. The method of claim 10 wherein the hand-held data transfer mechanism is a first transmitter/receiver electronically connected to the hand-held computer; wherein the node data transfer mechanism is a second transmitter/receiver electronically connected to the data distribution node; and wherein the operative connection between the first and second transmitter/receivers enables electronic communication between each of the plurality of hand-held computers and the central computer through the closest of the data distribution nodes.

12. The method of claim 11 further comprising the step of:

f') transmitting a identification signal, at least periodically, from the second transmitter/receiver of the data distribution node, alerting any of the plurality of hand-held computers that are within range of the transmission that they are within range.

13. The method of claim 12 further comprising the steps of:

f'') providing each of the plurality of hand-held computers with a means for automatically transmitting the data request to the nearest data distribution node once the hand-held computer receives the identification signal; and f''') transmitting the data request to the central computer upon receipt of the identification signal by one of the plurality of hand-held computers.

14. The method of claim 13 further comprising the step of:

f'''') inputting an identification number uniquely associated with each of the plurality of hand-held computers;

f''''') transmitting the identification number upon receipt of the identification signal;

f'''''') comparing the identity of the traveler with the associated flight arrival places and times and the flight departure places and times; and f''''''') alerting the traveler if there have been any changes to the associated flight arrival places and times and the flight departure places and times.

15. The method of claim 12 further comprising the steps of:

f'') providing each of the plurality of hand-held computers with a smart label that reflects the identification signal to form a reflected signal that is unique to each of the hand-held computers, the receipt of the reflected signal by the data distribution node being reported to a report database of the central computer.

16. The method of claim 11 further comprising the steps of:

n) using the first transmitter/receiver of the hand-held computer to transmit an electronic request to the central computer through the second transmitter/receiver of the data distribution node, the electronic request containing a first electronic signature that identifies the hand-held computer that is transmitting the electronic request;

o) delivering the electronic request to the central computer with a second electronic signature, the second electronic signature identifying the location of the data distribution node that delivered the electronic request;

p) processing the electronic request by the central microprocessor and preparing an electronic response;

q) delivering the electronic response from the central computer to the data distribution node identified in the second electronic signature;

r) transmitting the electronic response from the second transmitter/receiver of the data distribution node, the transmission being routed to the hand-held computer that sent the electronic request as directed by the first electronic signature;

s) storing the electronic response in the hand-held data storing means; and t) displaying the electronic response on the display screen.

17. A method for providing an electronic concierge service to at least one hotel guest, the method comprising the steps of:

a) providing a central computer having a central microprocessor operably connected to a central means for storing data;

b) programming into the central data storing means an entertainment database;

c) checking the at least one hotel guest into a hotel;

d) providing the at least one hotel guest with a hand-held computer having a display screen, a keypad, a means for requesting data, and a hand-held means for storing data operatively connected to a hand-held microprocessor.

e) providing at least one data distribution nodes having a means for downloading data from the central data storing means to the hand-held computer in response to the hand-held data transfer mechanism;

f) installing the at least one data distribution nodes in publicly accessible locations around the hotel;

g) operably connecting each of the data distribution nodes to the central computer;

h) inputting into the entertainment database, on a regular basis, entertainment information of interest to the at least one hotel guest;

i) operatively connecting the hand-held microprocessor with the closest of the plurality of data distribution nodes;

j) using the hand-held data transfer mechanism to request information from the entertainment database; and k) transmitting information from the entertainment database from the central computer to the hand-held data storing means.

18. A method for distributing data from a travel agency to a traveler, the method comprising the steps of:

a) providing a central computer having a central microprocessor operably connected to a central means for storing data;

b) programming into the central data storing means a traveler database, a flight database, and an entertainment database;

c) programming into the flight database a plurality of aircraft arrival places and times, a plurality of aircraft departure places and times, and a plurality of baggage claim carousel numbers;

d) programming into the entertainment database entertainment information of interest to the traveler;

e) programming into the traveler database an identity of the traveler who will be using the services of the travel agency;

f) preparing an airplane ticket for the at least one traveler;

g) associating the identity of the traveler in the traveler database with the aircraft departure time, the aircraft arrival time, and the baggage claim carousel number of the flight database;

h) associating information of interest to the traveler in the entertainment database with the identity of the traveler;

i) providing the traveler with a hand-held computer having a display screen, a keypad, a means for requesting data, and a hand-held means for storing data operatively connected to a hand-held microprocessor;

j) providing a plurality of data distribution nodes, each of the data distribution nodes having a means for downloading data from the central data storing means to the hand-held computer in response to the hand-held data transfer mechanism;

k) installing each of the data distribution nodes in locations that will be accessible to the traveler during the trip;

l) operably connecting each of the data distribution nodes to the central computer;

m) updating the information stored in the flight database and entertainment database on a regular basis;

n) operatively connecting the hand-held microprocessor with the closest of the plurality of data distribution nodes;

o) using the hand-held data transfer mechanism to transmit the identity of the traveler to the central computer through the closest of the plurality of data distribution nodes;

p) transmitting, from the central computer to the hand-held data storing means, the one of the plurality of aircraft departure places and times, the one of the plurality of aircraft arrival places and times, and the one of the plurality of baggage claim carousel numbers that are associated with the identity of the traveler; and q) transmitting, from the central computer to the hand-held data storing means, the information of interest associated with the identity of the traveler.

* * * * *